Dec. 10, 1929.　　　C. M. SAVRDA　　　1,739,471
AUTOMATIC GEAR SHIFTING MECHANISM
Filed May 8, 1928　　　4 Sheets-Sheet 1
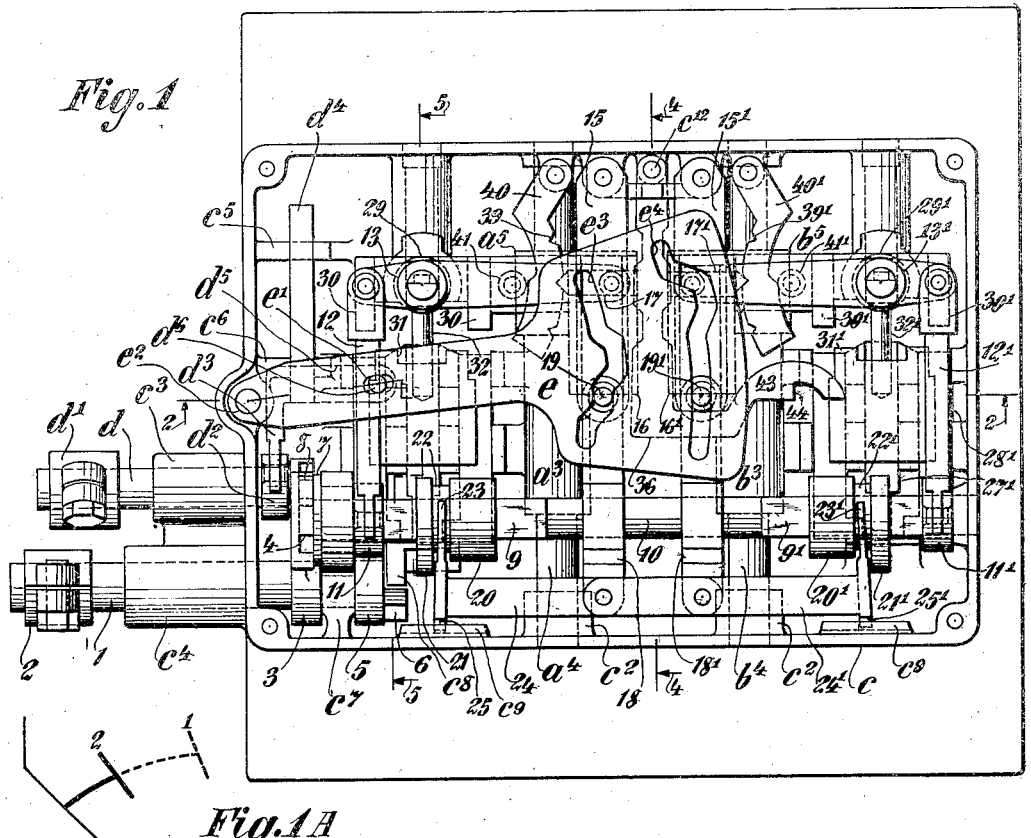
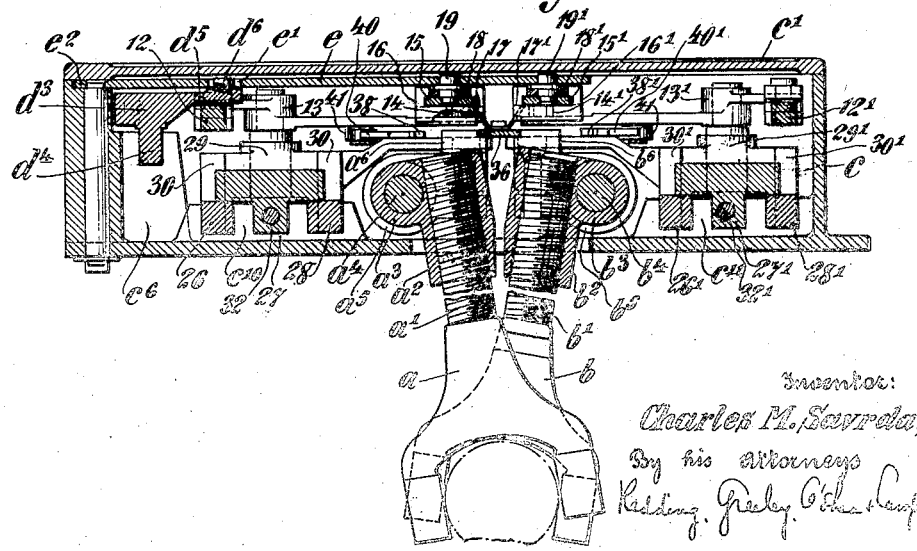

Dec. 10, 1929.  C. M. SAVRDA  1,739,471
AUTOMATIC GEAR SHIFTING MECHANISM
Filed May 8, 1928  4 Sheets-Sheet 2
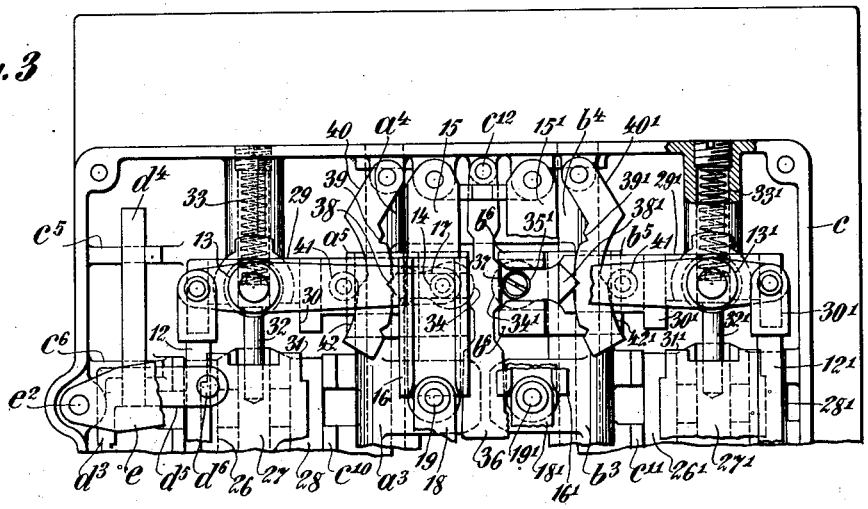
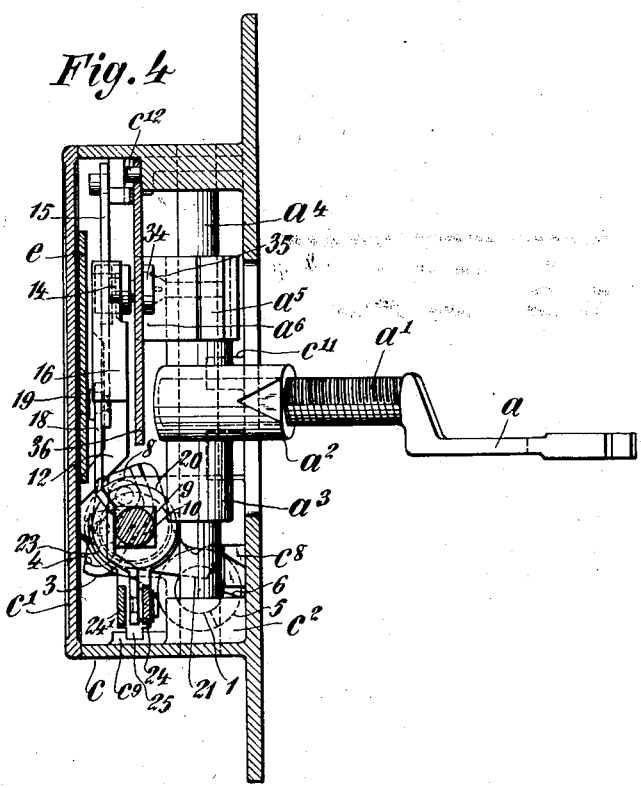
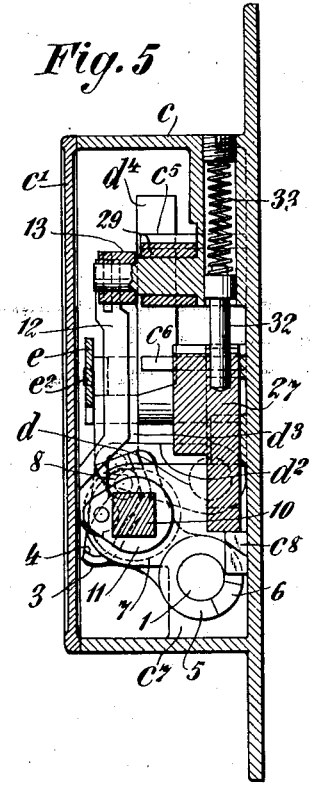
Inventor:
Charles M. Savrda,
By his attorneys
Redding, Greeley, O'Shea + Campbell

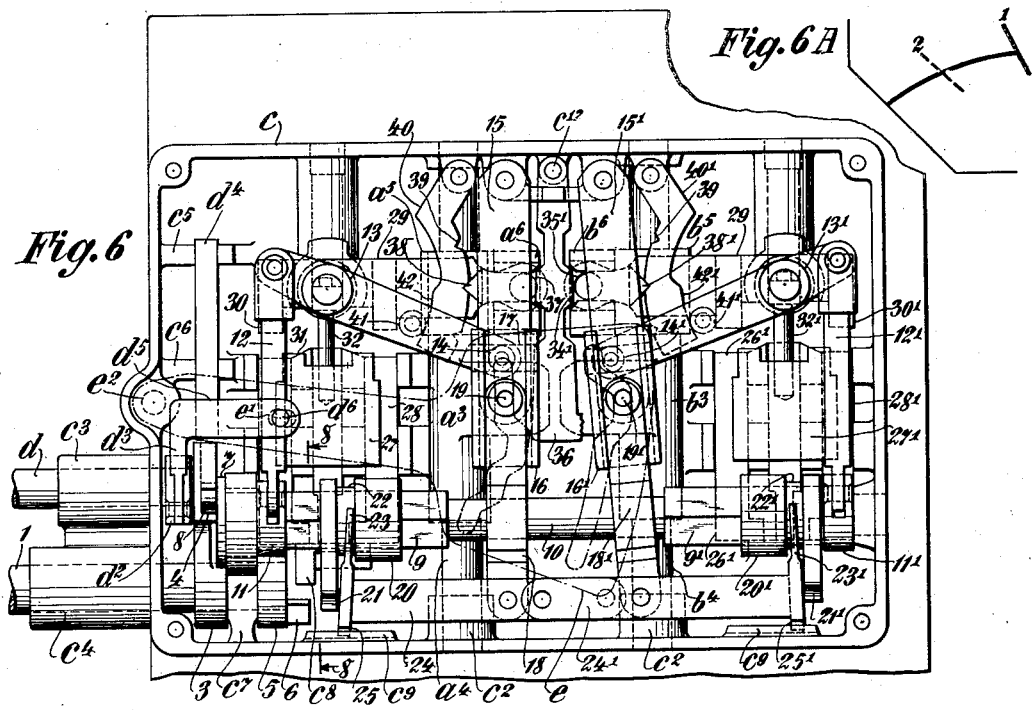
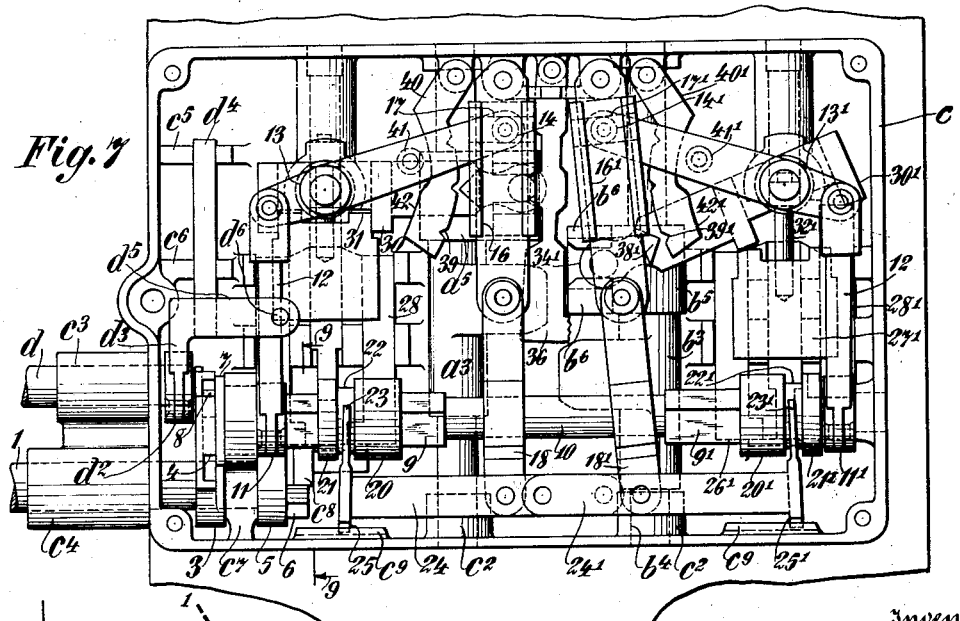

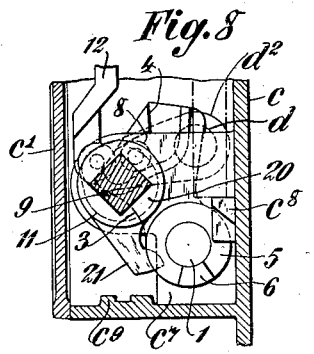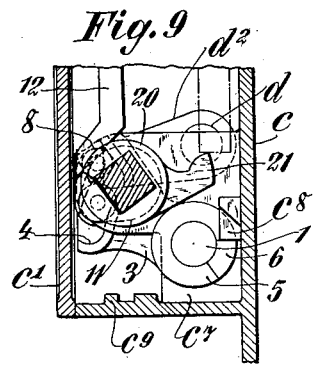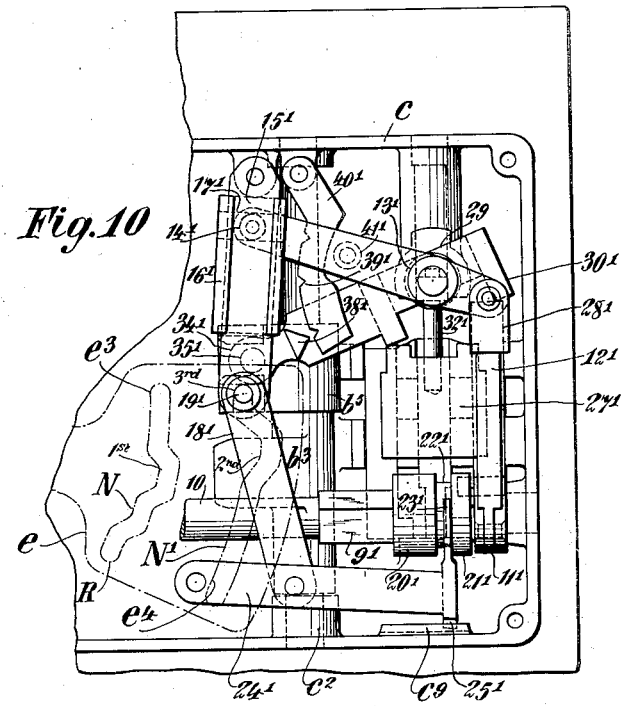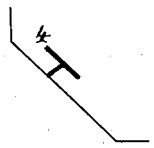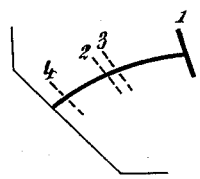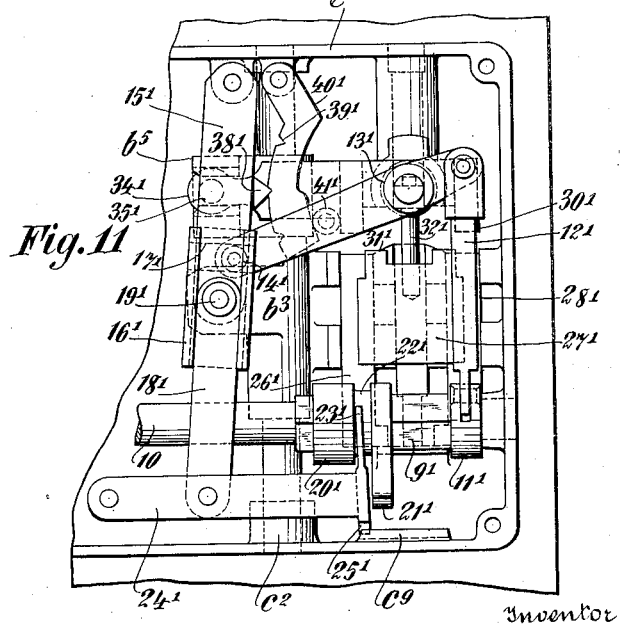

Patented Dec. 10, 1929

1,739,471

UNITED STATES PATENT OFFICE

CHARLES M. SAVRDA, OF BAYSHORE, NEW YORK, ASSIGNOR TO AUTOSHIFT CORPORATION, OF NEW YORK, N. Y., A CORPORATION OF NEW YORK

AUTOMATIC GEAR-SHIFTING MECHANISM

Application filed May 8, 1928. Serial No. 276,010.

The present invention relates to gear shifting mechanism of the automatic, or semi-automatic type, wherein a predetermined shift of gears is selected by a device operated by the driver of the vehicle and the shift is perfected upon depressing the clutch pedal in the usual manner.

Although there have been previous designs of automatic gear shifting mechanism for vehicles, their construction has been such that the shifting of the gears is impositive and no provision has been made for preventing incorrect operation due to inadvertence of the driver or other casual causes. For successful operation, it is necessary that the mechanism be capable of shifting from any given gear connection to any other speed available by the transmission. In so shifting, the mechanism must move the desired gears into mesh and positively hold them there while locking other movable gears from movement.

Having in mind the above principles, an object of this invention is to provide an automatic gear shifting mechanism for vehicles which is positive in operation and entirely eliminates any chance of jamming or engaging any incorrect combination of gears. The mechanism is such that, by a simple selective movement of the operator of the vehicle, a predetermined shift of gears may be selected and, at any subsequent time, the clutch pedal may be depressed to effect, automatically, such gear shift, simultaneously with the disengagement of the clutch members.

Further objects and advantages will appear as a more detailed description of the invention proceeds and reference will now be had to the accompanying drawings, wherein:

Figure 1 is a plan view of the gear shifting mechanism with the cover plate of the housing removed to expose the elements.

Figure 1A is a diagrammatic illustration of the position of the clutch pedal when the elements have been moved to the position shown in Figure 1.

Figure 2 is a view in section, taken on line 2—2 of Figure 1, and looking in the direction of the arrows.

Figure 3 is a segmental view, similar to the upper portion of Figure 1, but with a portion of the elements on the right under side thereof broken away to expose the elements at the bottom of the housing.

Figure 4 is a view in section taken on line 4—4 of Figure 1, and looking in the direction of the arrows.

Figure 5 is a view in section, taken on line 5—5 of Figure 1, and looking in the direction of the arrows.

Figure 6 is a plan view, similar to Figure 1, but showing the guide plate and selective mechanism moved to the position for shifting into second gear.

Figure 6A is a diagrammatic view of the position of the clutch pedal when the condition illustrated in Figure 6 obtains.

Figure 7 is a view similar to Figure 6, but showing the position of the mechanism when the clutch pedal is depressed.

Figure 7A is a diagrammatic view showing the position of the clutch pedal when the condition illustrated in Figure 7 obtains.

Figure 8 is a view in section, taken on line 8—8 of Figure 6, and looking in the direction of the arrows.

Figure 9 is a view in section, taken on line 9—9 of Figure 7, and looking in the direction of the arrows.

Figure 10 is a segmental view showing the right-hand portion of the mechanism when the selector has been moved to select a shift into high speed.

Figure 10A is a diagrammatic view showing the position of the clutch pedal when the elements are in the position shown in Figure 10.

Figure 11 is a plan view, similar to Figure 10, showing the position of the elements when the clutch pedal has been released.

Figure 11A is a diagrammatic view illustrating the position of the clutch pedal when the elements are in the position indicated in Figure 11.

Referring to the above drawings, $a$ and $b$ represent shifter forks for operating the sliding gears of a vehicle transmission of any desired form. These forks are mounted on threaded shafts $a'$ and $b'$, respectively, and the latter carried by threaded arms $a^2$ and $b^2$, respectively. Arms $a^2$ and $b^2$ are formed on sleeves $a^3$ and $b^3$ which slide on the respective shafts $a^4$ and $b^4$. A casing $c$, having a cover $c'$, is provided with bosses $c^2$ to mount the shafts $a^4$ and $b^4$ as clearly shown in Figure 1. Housing $c$ is formed with outwardly extending bearings $c^3$ and $c^4$, the former receiving shaft $d$, operated by suitable manual mechanism mounted in a position convenient to the operator of the vehicle through crank $d'$ carried by the shaft $d$.

Within the housing, the extremity of shaft $d$ is provided with a crank $d^2$. The housing $c$ is formed with guides $c^5$ and $c^6$ which receive slide $d^4$. This slide is formed as an extension to link $d^3$ which is connected to the crank $d^2$. It will be seen that movement of the shaft $d$ about its axis will cause the link $d^3$ to be moved in a plane perpendicular to the axis of shaft $d$ due to the constraint of slide $d^4$. A second extension $d^5$ on the link $d^3$ is provided with a pin $d^6$ for engaging a slot $e'$ in a pivoted guide plate $e$. This guide plate is pivoted to the housing at $e^2$ and has formed in its extremity, slots $e^3$ and $e^4$. The function of these slots will be described more fully hereinafter and at the present time, it will be sufficient to say that the slots are formed as arcs, the centers of which are the pivot point $e^2$ of the guide plate $e$. That portion of slot $e^3$ which lies in an arc, the radius of which equals the radius of the arc represented by the reference character N (Figure 10) represents the portion of the slot which moves the left-hand selecting mechanism to the neutral position. That portion of the slot $e^4$ which is indicated by the reference character N', represents the portion of the slot which moves the right-hand portion of the selecting mechanism to a neutral position. The other portions of slots $e^3$ and $e^4$ represent the various speed change positions available through proper selection. Movement of the guide plate $e$ to effect the several combinations of gears available, is effected through the pin and slot connection between link $d^3$ and guide plate $e$.

A shaft 1, operated by the clutch pedal of the vehicle through crank 2, is journaled in bearing $c^4$ and its extremity is journaled within bearing $c^7$, formed within the housing $c$. A crank 3 is mounted on the shaft 1 and formed with a cam groove 4. Upon the other side of bearing $c^7$ the shaft 1 is provided with a crank 5, formed with a pin or lug 6. An abutment $c^8$ (Figures 8 and 9) is formed within the housing for limiting the movement of crank 5 and pin 6 in one direction. Mounted within a second recess formed in bearing $c^7$, is a sleeve 7 provided with a roller 8 for engaging the cam slot 4 in crank 3. In this manner, certain movements of shaft 1 are transmitted to sleeve 7 which is mounted upon the squared end section 9 of power shaft 10. At the distant end of the shaft 10, a second squared section 9' is formed. Upon the squared sections 9 and 9', cranks 11 and 11' are mounted, the extremities thereof being connected to links 12 and 12', respectively. These links are connected to the short arms of bell cranks 13 and 13', respectively, the long arms of which are provided with upwardly extending pins 14 and 14', respectively, (Figure 2).

Mounted pivotally within the housing $c$ are links 15 and 15', each carrying the respective slides 16 and 16'. In the under sides of these slides, transverse slots 17 and 17' are formed to receive the respective pins 14 and 14'. It will be seen that movement of power shaft 10 will cause links 12 and 12' to move cranks 13 and 13' to cause pins 14 and 14' to engage the respective slots 17 and 17', thus causing a corresponding movement of slides 16 and 16' along the links 15 and 15'.

Pivoted to the extremities of links 15 and 15', are links 18 and 18', respectively. The pins 19 and 19' which pivot these links together extend upwardly and are received in the respective slots $e^3$ and $e^4$. Slides 16 and 16' may thus slide beyond the pivots 19 and 19' to make a solid lever out of the respective links when such slides lie with the pivot pins 19 and 19' between the ends thereof. Slidably mounted on the squared sections 9 and 9', are sleeves 20 and 20'. These sleeves are formed with fingers 21 and 21', respectively, and grooves 22 and 22'. Within the grooves 22 and 22', forks 23 and 23' are received. These forks are formed as angular extensions of sliding links 24 and 24', respectively, which are pivoted to the extremities of the respective links 18 and 18'. Heels 25 and 25' formed on the respective forks engage slots formed in bosses $c^9$ in the housing $c$. By means of this construction, movement of the lower ends of links 18 and 18' cause a corresponding sliding movement of links 24 and 24', respectively, to move the sleeves 20 and 20' along the squared sections 9 and 9'.

At this point, it is well to summarize the operation of the elements described above. As previously stated, the guide plate $e$ may be moved in either direction to select a given shift, resulting in a predetermined lateral movement of the pivot pins 19 and 19' in accordance with the configuration of the slots $e^3$ and $e^4$. In the position shown in Figure 1, both pins are moved to a neutral position. When the clutch pedal is depressed from position 1 (Figure 1A) to position 2, the cam slot 4 is moved to cause the right-hand extremity thereof to engage the roller 8 (which is in the position shown in Figure 8) and continued movement of the pedal moves the roller to the position shown in Figure 9. During this latter portion of the movement of the clutch pedal, power shaft 10 is moved in a counterclockwise direction when viewed from the right in Figure 1 and cranks 11 and 11' move the links and connected cranks 13 and 13' upwardly. This results in an upward movement of slides 16 and 16' and links 15, 15' and 18, 18' are free to move with respect to each other. The fingers 21 and 21' have previously been moved to a predetermined position along the axis of shaft 10 and continued movement of the pedal from the second position shown in Figure 1A to the floor board causes these fingers to engage suitably formed keys described hereinafter for effecting a desired movement of the shifter forks. Upon reverse movement of the shaft 10, it will be quite apparent that the slides 16 and 16' move downwardly to form solid levers of the several links. Upon movement of the guide plate into a further position, these solid links will be moved to predetermined positions in accordance with the slots $e^3$ and $e^4$. Such movement will be transmitted to the links 24 and 24' to cause links 20 and 20' to be moved in either direction along the squared portions of shaft 10. In this manner the shifter fingers 21 and 21' are moved to a plurality of positions along the axis of the shaft.

Upwardly projecting webs $c^{10}$ and $c^{11}$ are formed with slots to receive keys 26, 27, 28 and 26', 27' and 28', respectively. The end of these keys lie in proximity to shaft 10 and along the line of movement of fingers 21 and 21', respectively. When the sleeves 20 and 20' are moved with the shaft 10, their respective fingers engage the corresponding slides selected by the selector mechanism described above.

Pivoted upon the pivot support of cranks 13 and 13', are the respective shifter levers 29 and 29'. Each lever is formed with squared abutments 30 and 30', respectively, for receiving the thrust of keys 26, 28, and 26', 28', respectively. In this manner, the shifter levers may be moved in either direction in accordance with the thrust of the appropriate key. Center keys 27 and 27' are formed with ends 31 and 31' which engage between the abutments 30 and 30' to lock the shifter levers against movement. These central keys are mounted upon guide rods 32 and 32' which are engaged by springs 33 and 33' to hold the central keys normally out of engagement with the shifter levers 29 and 29'.

The ends of shifter levers 29 and 29' are provided with rounded ends 34 and 34', each end being formed with an aperture 35 and 35' to provide access to the adjusting and positioning screws of the clamp for engaging the sleeves $a^3$ and $b^3$ in the proper positions. This is shown clearly in Figure 2, wherein $a^5$ and $b^5$ represent the respective clamps, each being provided with spaced lugs $a^6$ and $b^6$ for engaging the ends of shifter levers 29 and 29'. In this manner, the motion of the shifter fingers is transmitted to the respective shifter forks to effect a desired gear shift.

As previously stated, the central keys 27 and 27', when moved inwardly, prevent movement of their respective shifter forks. The slots in the guide plate are so positioned and formed that one sleeve 20 is in neutral position when the other sleeve is moved to either shifting position. It will therefore be seen that, during the actual shifting, one of the central keys will be moved inwardly to lock its shifter lever against movement while the other finger causes the desired movement of its shifter lever. This prevents improper functioning of the respective sides of the mechanism. As a further precaution which serves to prevent the shifting of one fork when the other fork has been moved to a predetermined engaging position, a link 36 is pivoted to the housing at $c^{12}$. This link is formed with projections 37 (Figure 6) which engage the recess formed between lugs $a^6$ and $b^6$ when the lever is moved in either direction. When either sleeve $a^3$ or $b^3$ is moved, the corresponding lugs $a^6$ and $b^6$ force locking lever 36 into engagement with the lugs on the other sleeve and hold it in this locked position until the first sleeve has been returned to its neutral position. In this manner, the sleeves are locked positively in a position representing any predetermined mesh of the gears.

The shifter levers 29 and 29' are provided with V-shaped notches 38 and 38' which engage teeth 39 and 39' in the pivoted locking levers 40 and 40', respectively. Cranks 13 and 13' carry rollers 41 and 41' on their under sides for engaging the rear sides of pivoted locking levers 40 and 40'. These rollers cooperate with cams 42 and 42' to force the levers 40 and 40' into engagement with the corresponding tooth 38 and 38'. Since cranks 13 and 13' are always in the position shown in Figure 6 when the shifter levers are moved to either shifting position, the rollers 41 and 41' engage the corresponding locking levers to lock the corresponding shifter lever in the position to which it has been moved.

To adapt the mechanism to all types of shifts, the links 24 and 24' are provided with extensions to permit either of the links 18 or 18' to be connected with either of the links 24 or 24'. In this manner, either of the shifter levers may be controlled by either of the slots in the guide plate and the type of shift required by the car upon which the mechanism is to be used may thus be accommodated by suitable adjustment.

In order to provide a lock to prevent actuation of the mechanism by an unauthorized party, the center lock lever 36 is provided with an L-shaped extension 43 having a notch 44. This notch may be engaged by a pivoted or sliding key of a key operated lock of any desired form, and when so engaged, the center lock lever 36 cannot be moved, thus preventing movement of either shifter sleeve $a^3$ or $b^3$.

It will be seen that the connection between elements 4 and 8 permits a degree of lost motion therebetween. This results in an inward movement of the clutch pedal prior to that portion of the movement thereof which results in the shifting of gears. In this manner, various types of mechanisms are accommodated by the automatic gear shifting mechanism described herein.

While the invention has been described in connection with the drawings enclosed herewith, it is obvious that various changes in the construction and arrangement of parts may be made, and the invention is not to be limited, save as defined in the appended claims.

I claim as my invention:

1. Automatic gear shifting mechanism for a vehicle comprising a shifter fork, an arm connected to the fork, a mechanical means for moving the arm, a selecting mechanism for effecting a predetermined movement of the mechanical means, a secondary selecting means operated by the mechanical means to move the arm in a desired position, and means to move the secondary means to a selected position and simultaneously cause it to move the arm.

2. An automatic gear shifting mechanism for a vehicle comprising a shifter fork, means for moving the fork to a desired position, means to select the position, manual means to perfect the selection, and means to cause the manual means to perfect the selection in any of a plurality of movements.

3. An automatic gear shifting mechanism for a vehicle comprising a shifter fork, means for moving the fork to a desired position, means to select the position, manual means to perfect the selection and effect the shifting of the fork, and means to cause the manual means to perfect the selection in any of a plurality of movements.

4. An automatic gear shifting mechanism for a vehicle comprising a shifter fork, means for moving the fork to a desired position, means to select the position, a pedal operable to perfect the selection and effect the shifting of the fork, and means to cause the pedal to perfect the selection during movement thereof in both directions.

5. An automatic gear shifting mechanism for a vehicle comprising a shifter fork, a power shaft, a guide plate, a plurality of keys for moving the shifter fork, means on the power shaft for operating the keys, a connection between the guide plate and operating means, and means to move the guide plate to cause a desired key to be operated.

6. An automatic gear shifting mechanism for a vehicle comprising a shifter fork, a power shaft, a guide plate, a plurality of keys for moving the shifter fork, a key for preventing movement of the shifter fork, means on the power shaft for operating the keys, a connection between the guide plate and operating means, and means to move the guide plate to cause a desired key to be operated.

7. An automatic gear shifting mechanism for a vehicle comprising a shifter fork, a power shaft, a guide plate, a pivoted lever connected to the shifter fork, a plurality of keys for moving the lever in opposite directions, a key for preventing movement of the shifter fork, a finger slidably mounted on the power shaft, and means operated by the guide plate for moving the finger to operate a desired key.

8. An automatic gear shifting mechanism for a vehicle comprising a plurality of shifter forks, a power shaft, a guide plate, pivoted levers connected to the shifter forks, a plurality of slidably mounted keys, means to cause the keys to operate the respective levers in either direction, a key slidably mounted to engage each lever to prevent movement thereof, fingers slidably mounted on the power shaft, and means operated by the guide plate to cause the fingers to engage certain of the keys.

9. An automatic gear shifting mechanism for a vehicle comprising a plurality of shifter forks, a power shaft, a guide plate, pivoted levers connected to the shifter forks, a plurality of slidably mounted keys, means to cause the keys to operate the respective levers in either direction, a key slidably mounted to engage each lever to prevent movement thereof, fingers slidably mounted on the power shaft, and means operated by the guide plate to cause one of the fingers to engage certain of the keys to cause one lever to be moved and the other finger to engage certain of the keys to cause the other lever to be locked against movement.

10. An automatic gear shifting mechanism for a vehicle comprising a plurality of selector forks, a power shaft, a guide plate, pivoted levers connected to the shifter forks, a plurality of slidably mounted keys, means to cause the keys to operate the respective levers in either direction, a key slidably mounted to engage each lever to prevent movement thereof, means normally to disengage the key from its lever, fingers slidably mounted on the power shaft, and means operated by the guide plate to cause the fingers to engage certain of the keys.

11. An automatic gear shifting mechanism for a vehicle comprising a selector fork, means for moving the fork, a guide plate, a plurality of pivoted links, means for connecting the links to the means for moving the fork, and means including a curved slot and a pin engaging the slot, for causing the guide plate to move the links.

12. An automatic gear shifting mechanism for a vehicle comprising a selector fork, means for moving the fork, a guide plate, a plurality of links, means for connecting the links to the means for moving the fork, and means for connecting the links rigidly to be moved as a unit by the guide plate.

13. An automatic gear shifting mechanism for a vehicle comprising a selector fork, means for moving the fork, a guide plate, a plurality of links, means for connecting the links to the means for moving the fork, a slide carried by the links, and means to move the slide by the guide plate.

14. An automatic gear shifting mechanism for a vehicle comprising shifter forks, means for moving the forks, a guide plate, means for causing the guide plate to select a predetermined shift, a locking lever, means to cause the movement of one fork to cause the lever to prevent movement of the other, and a lock receiving portion formed on the lever.

15. An automatic gear shifting mechanism for a vehicle comprising a shifter fork, means for moving the fork to a desired position, means to select the position, and a clutch pedal operable to perfect the selection and effect the shifting of the fork, said pedal having an initial clutch disengaging motion which is lost motion with respect to the perfecting operation, a continued motion which is lost motion to both the clutch mechanism and the perfecting mechanism, and a final motion which is lost motion with respect to the clutch mechanism but is positive with respect to the perfecting and shifting mechanism to effect the operation thereof.

This specification signed this 7th day of May, A. D. 1928.

CHARLES M. SAVRDA.